(12) United States Patent
Gyorfi et al.

(10) Patent No.: US 8,400,305 B2
(45) Date of Patent: Mar. 19, 2013

(54) METHOD AND APPARATUS FOR DETERMINING RANGE INFORMATION OF A NODE IN A WIRELESS SYSTEM

(75) Inventors: Julius S. Gyorfi, Vernon Hills, IL (US); Benjamin J. Benkritsky, Modiin (IL); Timothy J. Collins, Homer Glen, IL (US); Tom Mathew, Skokie, IL (US); Swee M. Mok, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 674 days.

(21) Appl. No.: 12/577,277

(22) Filed: Oct. 12, 2009

(65) Prior Publication Data

US 2011/0084841 A1    Apr. 14, 2011

(51) Int. Cl.
*G08B 13/14* (2006.01)
(52) U.S. Cl. ........... 340/572.4; 340/10.1; 455/457
(58) Field of Classification Search .......... 340/572.1, 340/10.1, 10.5, 10.6, 572.4; 455/456.1–457
See application file for complete search history.

(56) References Cited

U.S. PATENT DOCUMENTS

| | | | |
|---|---|---|---|
| 7,082,107 B1 | 7/2006 | Arvelo | |
| 7,142,120 B2 | 11/2006 | Charych et al. | |
| 7,489,240 B2 | 2/2009 | Soliman | |
| 7,489,242 B2 | 2/2009 | Hines et al. | |
| 7,532,868 B1 | 5/2009 | Sapozhnykov et al. | |
| 2003/0072322 A1 | 4/2003 | Collins et al. | |
| 2006/0214774 A1 | 9/2006 | Mochida | |
| 2008/0100439 A1* | 5/2008 | Rinkes | 340/572.1 |
| 2008/0174410 A1* | 7/2008 | Sarangapani et al. | 340/10.4 |
| 2009/0054096 A1 | 2/2009 | Single | |
| 2010/0039228 A1* | 2/2010 | Sadr et al. | 340/10.1 |

OTHER PUBLICATIONS

Zhao, et al., "Research on the Received Signal Strength indication Location Algorithm for RFID System," IEEE, International Symposium on Communications and Information Technologies, 2006. ISCIT '06, Oct. 18-20, 2006, pp. 881-885.
Wilson, et al., "Utilizing RFID Signalling Scheme for Localization of Stationary Objects and Speed Estimation of Mobile Objects," IEEE International Conference on RFID, Mar. 26-28, 2007, pp. 94-99.
John Burnell, "Alien Adds Major Capabilities to Gen2 RFID Readers," RFID Update, The RFID Industry Daily, Jun. 23, 2008, 3 pages. Downloaded Oct. 7, 2008 from http://www.rfidupdate.com/articles/index.php?id=1624.

(Continued)

*Primary Examiner* — Thomas Mullen
(74) *Attorney, Agent, or Firm* — Kenneth A. Haas; Barbara R. Doutre

(57) ABSTRACT

A method and apparatus for determining a range within a wireless communication system is provided herein. The range information can then be used to locate a node (e.g., an asset tag). During operation, the minimum transmission power of a source transceiver (e.g., an RFID reader) that enables a tag to be detected will be used to indicate distance. Changes in transmit power will be used to indicate relative changes in distance to a particular node. The reader will be configured to always operate at a transmission power that will result in a certain percentage (e.g., 50%) detection rate for a target transceiver (e.g., an RFID asset tag). As the reader moves closer to the tag, the minimum detection power will decrease; as it moves farther from the tag, the minimum detection power will increase. This information is displayed to give a general change in range information between the RFID reader and the asset tag (e.g., increasing range or decreasing range). An individual will be able to easily locate the asset tag by using the displayed information.

15 Claims, 16 Drawing Sheets

OTHER PUBLICATIONS

MoreRFID, "OMRON Develops World-First RFID Technology for Measuring the Distance Between UHF-band Antenna and IC Tags," MoreRFID, Sep. 21, 2007, 2 pages. Downloaded Oct. 7, 2009 from http://www.morerfid.com/details.php?subdetails=Report&action=details&report_id=3505&.

PCT International Search Report Dated Jan. 26, 2011.

Chuang-Wen You, et al. "Sensor-Enhanced Mobility Prediction for Energy-Efficient Localization", 2006 3rd Annual IEEE Communications Society Conference on Sensor and AD HOC Communications and Networks; Sep. 25-28, 2006; Reston, VA; IEEE Piscataway, NJ, Jan. 1, 2006, p. 565-574; XP031012219; ISBN:978-1-4244-0626-5.

Yuechun Chu, et al. "A UWB-Based 3D Location System for Indoor Environments" Broadband Networks, 2005 2nd International Conference on Boston, MA, Oct. 3-7, 2005, Piscataway, NJ, USA, IEEE Oct. 3, 2005, pp. 224-232; XP010890346, DOI: DOI:10.1109/ICBN-2005.1589737; ISBN 978-0-7803-9276-2.

* cited by examiner

METHOD AND APPARATUS FOR DETERMINING RANGE INFORMATION OF A NODE IN A WIRELESS SYSTEM

FIELD OF THE INVENTION

The present invention relates generally to locating a node in a communication system and in particular, to a method and apparatus for determining range information and location of a node within a wireless communication system.

BACKGROUND OF THE INVENTION

A variety of systems have been proposed that call for the ability for wireless sensor networks (WSNs) to determine the location of a node within a wireless communication system. For example, in asset control, it is desirable to know the locations of objects (e.g., laptop computers, cell phones, shipping containers with a built-in sensor node, shared hospital equipment with either an attached or built-in sensor node, . . . , etc.) within the confines of, say, an office building, factory floor, or other general or specialized space. Unfortunately, many location applications for wireless sensor networks are characterized by their severe resource constraints (e.g. energy, bandwidth, processing power, and memory), which have a considerable impact on the location performance. For example, many WSN applications require very long lifetime to avoid frequent re-charging or battery replacement. A difficulty in designing an efficient location technique is managing the tradeoff between resource usage and the location performance. Minimizing resource consumption leads to degradation in location accuracy, while increasing resource consumption leads to a more accurate location estimate. Therefore a need exists for a method and apparatus for determining the range and location of a node within a wireless communication system that balances resource constraints with location accuracy.

Figure 1:
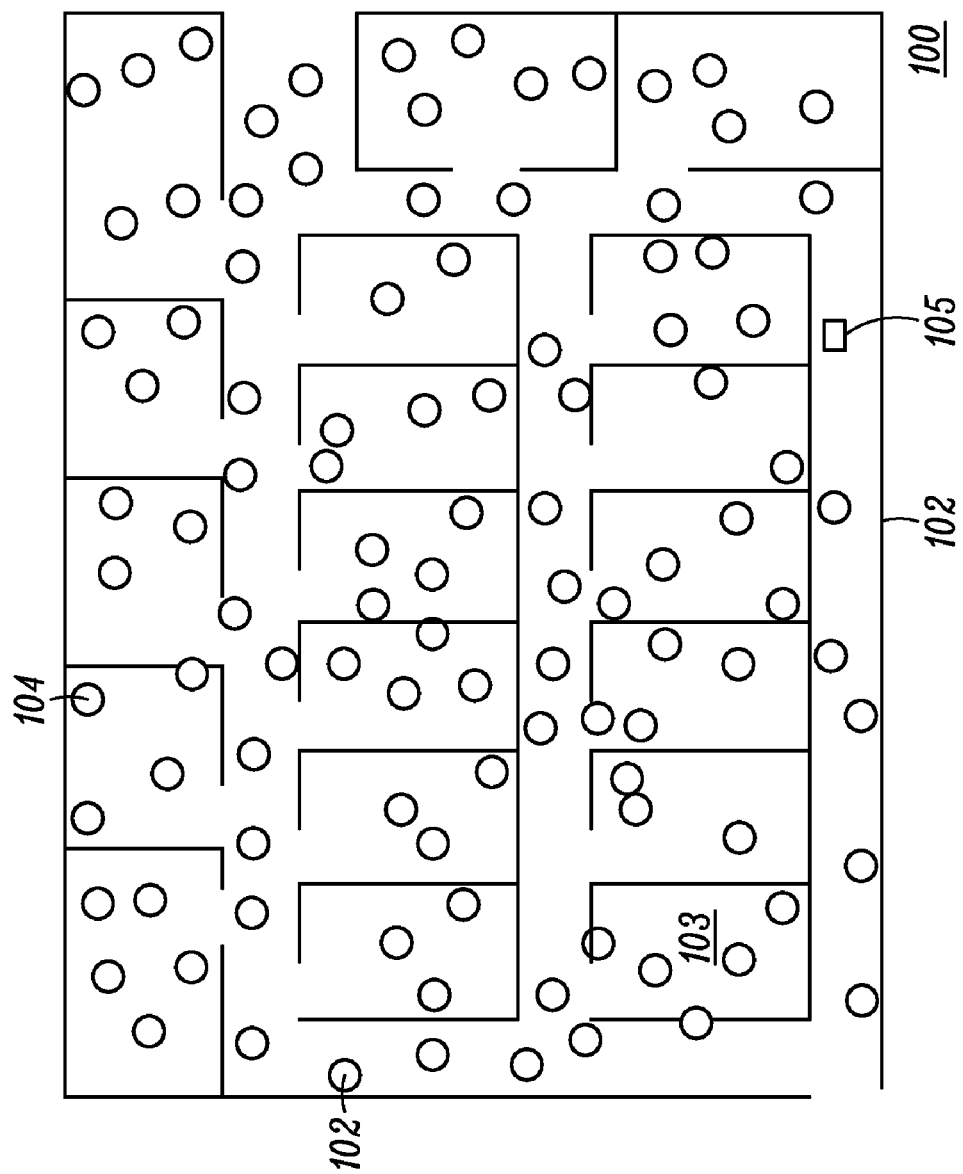
FIG. 1 Illustrates a typical floor plan of an office building in which are located a number of wireless devices involved in determining each other's location.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to address the above-mentioned need, a method and apparatus for an energy efficient determination of a range within a wireless communication system is provided herein. The range information can then be used to locate a node. During operation, the minimum transmission power of a source transceiver (e.g., an RFID reader) that enables a tag to be detected will be used to indicate distance. Exact correlation of minimum detection power to absolute distance is not feasible due to variable tag orientations, differing environmental configurations (obstacles, reflectors, etc.), multipath effects, and different absorption characteristics of the materials to which the tags are affixed. Because of this, changes in transmit power will be used to indicate relative changes in distance to a particular node. The reader will be configured to always operate at a transmission power that will result in a certain percentage (e.g., 50%) detection rate for a target transceiver (e.g., an RFID asset tag). The transmission power that produces this desired detection rate is defined to be the minimum detection power. As the reader moves closer to the tag, the minimum detection power will decrease; as it moves farther from the tag, the minimum detection power will increase. This information is displayed to give a general change in range information between the RFID reader and the asset tag (e.g., increasing range or decreasing range). An individual will be able to easily locate the asset tag by using the displayed information.

Using a minimum reader transmission power needed to detect the target tag is a better indicator of distance than RSSI because it is less sensitive to environmental changes than RSSI. Finally, the above-described technique also has the added benefit of ensuring that the reader is always operating at the minimum transmission power needed to detect the target tag, which should aid existing power management efforts to maintain battery life.

The present invention encompasses a method for determining location information within a communication system. The method comprises the steps of transmitting a plurality of queries to a node within the communication system, listening for responses from the node, and determining a detection rate. The detection rate is based on a number of responses heard from the node and a number of queries transmitted to the node. A transmit power needed to maintain a desired detection rate is determined and the transmit power is adjusted to maintain the desired detection rate. Finally, information is displayed about the transmit power.

The present invention additionally encompasses an apparatus for determining location information within a communication system. The apparatus comprises a transmitter transmitting a plurality of queries to a node within the communication system, a receiver listening for responses from the node, logic circuitry determining a detection rate based on a number of responses heard from the node and a number of queries transmitted to the node, the logic circuitry additionally determining a transmit power needed to maintain a desired detection rate and adjusting the transmit power to maintain the desired detection rate. The apparatus additionally comprises a display displaying information about the transmit power.

Turning now to the drawings, wherein like numerals designate like components, FIG. 1 is a block diagram of communication system 100 deployed over a floor plan of an interior of an office building. Communication system 100 comprises wireless devices 104-105 involved in determining a particular node's location. The office building comprises perimeter wall 102 that encloses a plurality of offices 103 (only one labeled).

Circular objects 104 represent nodes, or wireless transceivers that may be located as described below. Because the locations of nodes 104 are to be determined, these nodes 104 are referred to as "blindfolded" nodes or simply "blind" nodes. Blind nodes 104 can include, for example, transceiver security tags attached to valuable assets such as lap top computers, radio frequency identification (RFID) tags, or be embedded in wireless communication devices including cellular telephones. Rectangular object 105 represents a wireless transceiver (preferably handheld) that is used to locate nodes 104.

In the preferred embodiment of the present invention transceiver 105 comprises an asset tag reader such as Handheld Mobile Computer asset tag readers manufactured by Motorola, Inc. Additionally, blind nodes 104 preferably comprise RFID asset tags such as an AD-222 asset tag manufactured by Avery Dennison.

It should be noted that although FIG. 1 shows nodes 104-105 existing within a two-dimensional space, one of ordinary skill in the art will recognize that nodes 104-105 may be located in other environments, including 3-dimensional spaces. For example, nodes 104 may comprise manufactured goods equipped with wireless transceivers located on an assembly line. In a similar manner, nodes 104 may comprise inventory located within a multi-level warehouse. Irrespective of the environment where nodes 104 operate, a single asset tag reader 105 is used to assist in locating nodes 104. More particularly, it is envisioned that reader 105 will determine if a particular node is approaching reader 105 or receding from reader 105 based on a change in the minimum detection power for node 104, i.e., a change in the reader's transmit power needed to maintain a certain percentage detection rate of the particular node.

Determining Range Information:

Communications between reader 105 and asset tags 104 are designed such that an asset tag will respond to reader 105 when polled. More particularly, reader 105 will send out a wireless request (referred to as a query) for communications with a particular asset tag. The request is transmitted at a particular power level, and includes identification information for the asset tag polled. When the asset tag receives the wireless request, it will respond with a message (referred to as a response) indicating that the request was received. During operation, reader 105 will operate at a power level such that a certain percentage (e.g., 50%) of the requests will not result in a response being detected by reader 105. (It should be noted that a non-response may be because the asset tag polled did not receive the request and hence did not respond, or it may be because the response from the asset tag was received in error).

The number of actual detections (responses) divided by the number of attempts (polls) will yield the measured detection rate. Reader 105 will adjust the transmission power based on the deviation of the measured detection rate from the desired detection rate (e.g, 50%). This can be achieved through the use of a proportional controller that scales the deviation between the desired detection rate and the measured detection rate by a gain to produce an incremental change in the transmission power. It should be noted that reader 105 may filter large variations in transmit power. Filtering is performed to smooth large variations in the transmit power over time. The transmit power may jump around due to a moving reader and/or tag, while the reader is initially converging upon the minimum detection power, or if the controller gain is too large. During operation of reader 105, a user interface is provided to indicate any change in power level required to maintain a desired detection rate. For example, if the power level needed for a desired detection rate is increasing, then it can be inferred that the reader is receding from the polled asset tag. Alternatively, if the power level needed for a desired detection rate is decreasing, then it can be inferred that the reader is approaching the polled asset tag.

Figure 2:
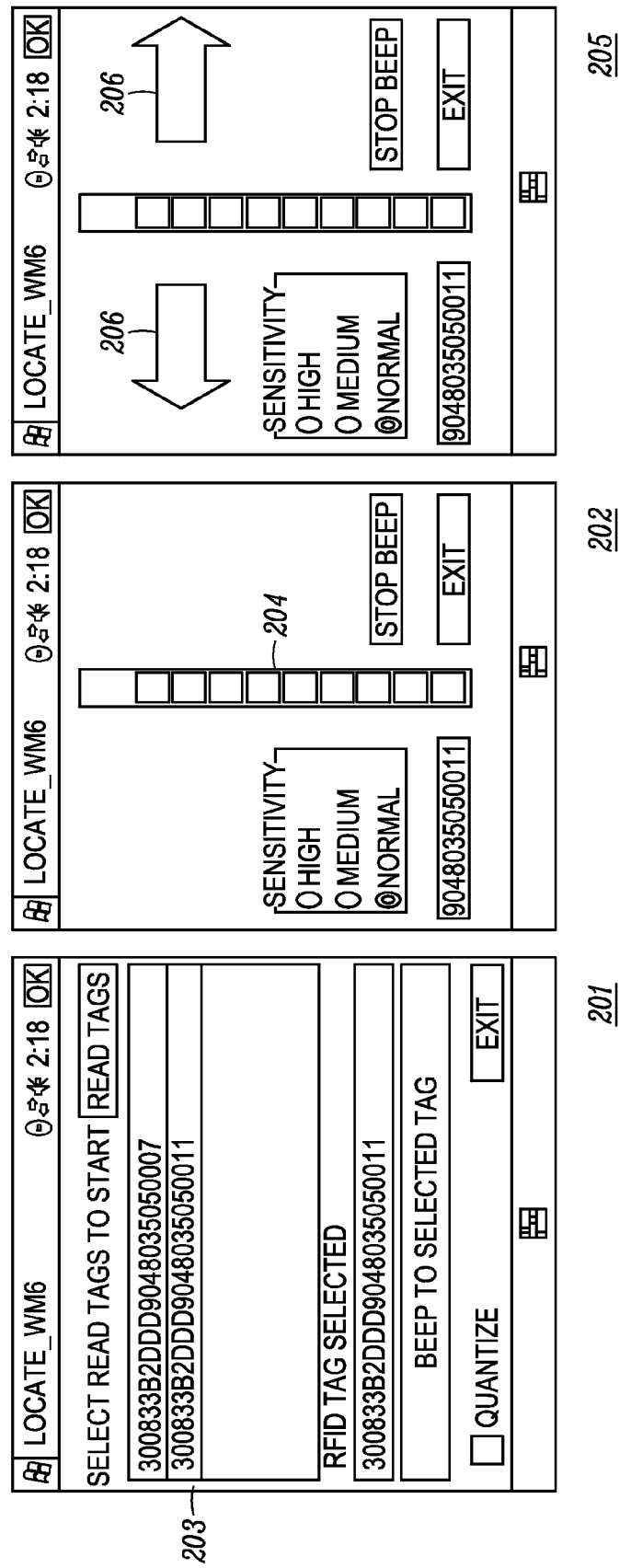
FIG. 2 shows a user interface for an asset tag reader.

Using the Range Information to Locate a Node:

FIG. 2 illustrates a simple user interface consisting of screen 201 and screen 202 designed to provide information to a user on whether or not the user is approaching or receding from a polled asset tag. Screen 201 shows the reader initially determining which tags 203 are within range and enabling the user to select one for range-finding. Screen 202 shows a visual range indication 204: the higher the bar, the closer you are to the tag. The height of the bar is inversely related to the transmit power; when the transmit power is minimum, the bar is at its highest; when the transmit power is maximum, the bar is at its lowest. There may also be an audible indication (e.g., beeping) associated with the visual range indication, similar to a Geiger counter, where beep rate increases as distance decreases.

During operation a user selects a particular tag 203 for range-finding using screen 201. The user will then visually observe screen 202 (and listen to the audible output) while moving through the environment. The user's movements will affect the visual and audible indicators; if the user is approaching the tag, the visual indicator bar will grow and the beep rate will increase, providing feedback to the user that he is moving toward the tag.

Figure 3:
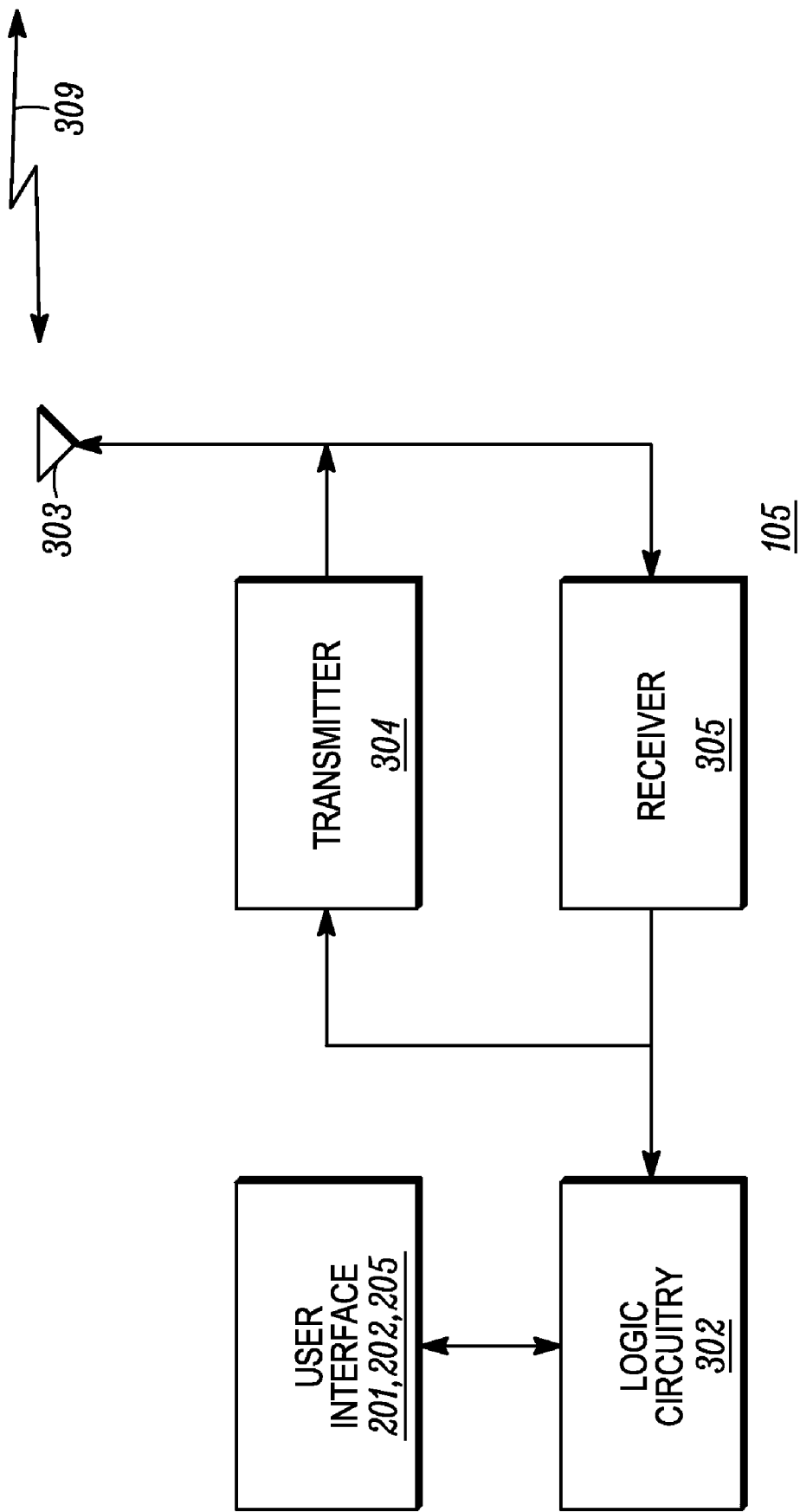
FIG. 3 is a block diagram of an asset tag reader.

FIG. 3 is a block diagram of asset tag reader 105. In the preferred embodiment of the present invention reader 105 comprises an MC9090-G Handheld Mobile Computer asset tag reader manufactured by Motorola, Inc. As shown, reader 105 comprises logic circuitry 302 coupled to transmitter 304 and receiver 305. Transmitter 304 and receiver 305 are in turn coupled to antenna 303. Logic circuitry 302 preferably comprises a microprocessor controller, such as, but not limited to an Intel® XScale™ Bulverde PXA270 microprocessor. In the preferred embodiment of the present invention logic circuitry 302 serves as means for determining a power level necessary to maintain a desired detection rate for an asset tag, and displaying the range estimate on user interface 202.

Receive and transmit circuitry are common circuitry known in the art for communication utilizing a well known communication protocol such as the EPC™ Radio-Frequency Identity Protocols Class-1 Generation-2 UHF RFID Protocol for Communications at 860 MHz-960 MHz Version 1.0.9. Receive and transmit circuitry serve as means for transmitting and receiving messages. For example, transmitter 304 transmits communication request messages to asset tags 104 using antenna 303 and over-the-air communication signal 309 while receiver 305 receives responses to those requests via over-the-air communication signal 309.

During operation logic circuitry 302 receives an instruction from user interface 201 to locate a particular asset tag 104. In response, logic circuitry 302 instructs transmitter 304 to periodically transmit queries (e.g., one query every 25 milliseconds) to the particular asset tag. Additionally, logic circuitry 302 instructs receiver 305 to listen for responses from the particular asset tag. If a response is heard for a particular query, then logic circuitry 302 infers that the asset tag was detected. However, if no response was received by receiver 305, then logic circuitry 302 infers that the asset tag was not detected. Logic circuitry 302 will determine a % detection rate from the number of queries issued and the number of detections of the particular asset tag, and adjust the power level of transmitter 304 to maintain a desired detection rate. For example, assuming a desired detection rate of 50%, if the detection rate is determined to be <50%, the transmit power of transmitter 304 will be increased, likewise, if the detection rate is determined to be >50%, the transmit power of transmitter 304 will be decreased. All the while, the range estimates will be output to user interface 202 for display. A user of device 105 will then be able to locate a particular asset tag by simply moving in the direction of ever-decreasing power.

Figure 4:
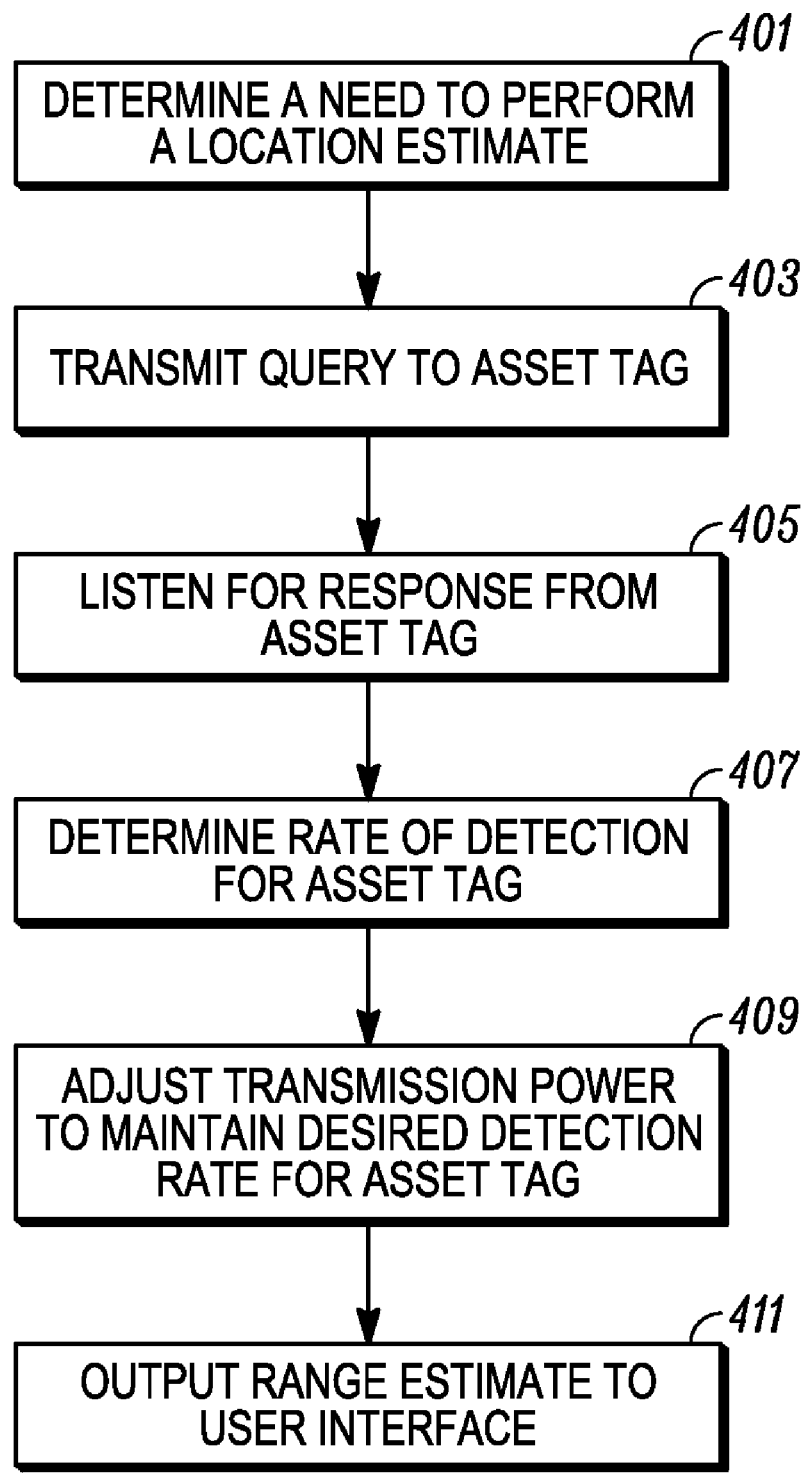
FIG. 4 is a flowchart showing operation of the reader of FIG. 3.

FIG. 4 is a flowchart showing operation of the reader of FIG. 3. The logic flow begins at step 401 where logic circuitry 302 receives an instruction from user interface 201 to locate a particular node (e.g. asset tag 104). In response, logic circuitry 302 instructs transmitter 304 to periodically transmit a plurality of queries (e.g., one query every 25 milliseconds) to the particular asset tag (step 403). Additionally, logic circuitry 302 instructs receiver 305 to listen for responses from the particular asset tag (node) (step 405). As discussed above, asset tags within the communication system transmit a response as a result of hearing one of the plurality of queries transmitted by the transmitter.

At step 407 logic circuitry 302 determines a rate of detection for the particular asset tag. The rate of detection (detection rate) is based on a number of responses heard from the node and the number of queries transmitted to the node. In the preferred embodiment the detection rate comprises a number of responses heard divided by a number of polls sent. If a response is heard for a particular query, then logic circuitry 302 infers that the query was successfully received by the particular asset tag. However, if no response was received by receiver 305, then logic circuitry 302 infers that the query was not received by the particular asset tag.

Continuing, at step 409 logic circuitry 302 determines a transmit power needed to maintain a desired detection rate (e.g., 50%) and will adjust the power level of transmitter 304 to maintain a desired detection rate for the particular asset tag. For example, assuming a desired detection rate of 50%, if the detection rate is determined to be <50%, the transmit power of transmitter 304 will be increased, likewise, if the detection rate is determined to be >50%, the transmit power of transmitter 304 will be decreased. Finally, at step 411, the power/range information will be output by logic circuitry 302 to user interface 202 for display. As discussed above, the step of displaying information about the transmit power comprises the step of displaying a bar with a height of the bar indicating the transmit power. Additionally, an audible indication of transmit power may be output by logic circuitry operating a speaker. A user of device 105 will then be able to locate a particular asset tag by simply moving in the direction of ever-decreasing power since the movements will affect the displayed information. The displayed bar will grow or shrink in order to provide feedback to a user that the user is moving toward or away from the node.

Providing Angular Information to the User:

The above discussion described how the minimum detection power changes with changing radial distances between the reader and the tag. The following text describes a complementary effect: how the minimum detection power changes with azimuth angle for a fixed distance. This information can be utilized by logic circuitry 302 to output angular information to a desired tag. This is illustrated in FIG. 2 as display 205. As is evident, display 205 comprises arrows 206 that will light up to provide azimuth direction to a particular tag.

In doing so, logic circuitry 302 will consider the fact that the minimum detection power will be lowest at 90° and 270° (see FIG. 5) because the antenna gain is at its maximum. The minimum detection power will be highest at 0° and 180° because the antenna gain is at its minimum.

One should be careful not to confuse detection rate and minimum detection power. The reader is ALWAYS attempting to operate at the predefined detection rate (e.g., 50%) but as it is doing that the power CAN and WILL change as the reader and/or tag moves. In order to avoid confusion, the minimum detection power (MDP) is a power level a reader is always trying to operate at for a given distance AND orientation to obtain a desired detection rate. If we fix distance and vary orientation, the MDP itself will change (all the while, maintaining a 50% detection rate). It is the trend in the MDP over azimuth angle that the discussion below addresses. When we sweep through different azimuth angles, we are seeking the minimum MDP (i.e., the minimum of the minimum detection powers for a range of azimuth angles) because that will correspond to the reader being in line with the tag (either pointing directly at it, or 180° opposite.) Regardless of the direction we are pointing in and the current minimum detection power, the reader will be at a 50% detection rate.

Figure 5:
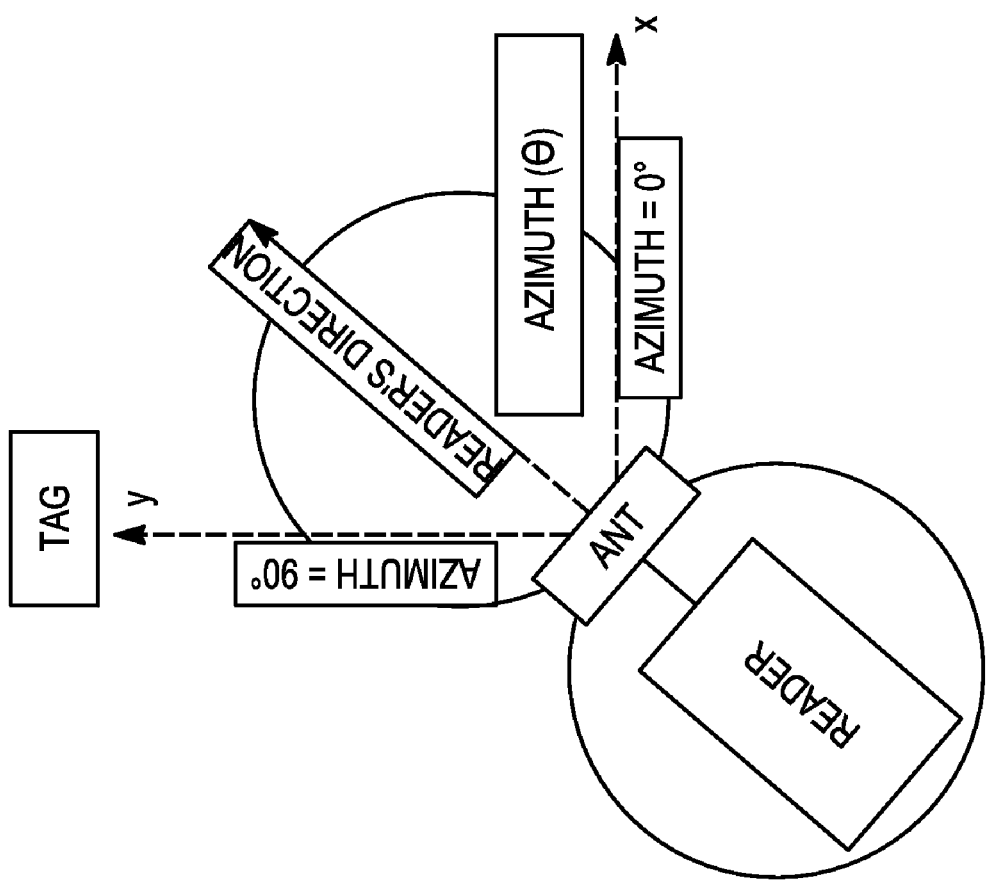
FIG. 5 is a diagram of a reader with a dipole antenna and a tag.

It should be noted that a reader's orientation affects the line-of-sight direction to the tag which in turn determines the effective antenna gain (or attenuation) and therefore the minimum detection power. FIG. 5 defines a workspace configuration including a coordinate frame and relative positions and orientations of an RFID reader and an RFID tag. The antenna (ANT) is assumed to be a simple dipole with the cross-section of the antenna pattern in the x-y plane superimposed on the antenna in the diagram.

Figure 6:
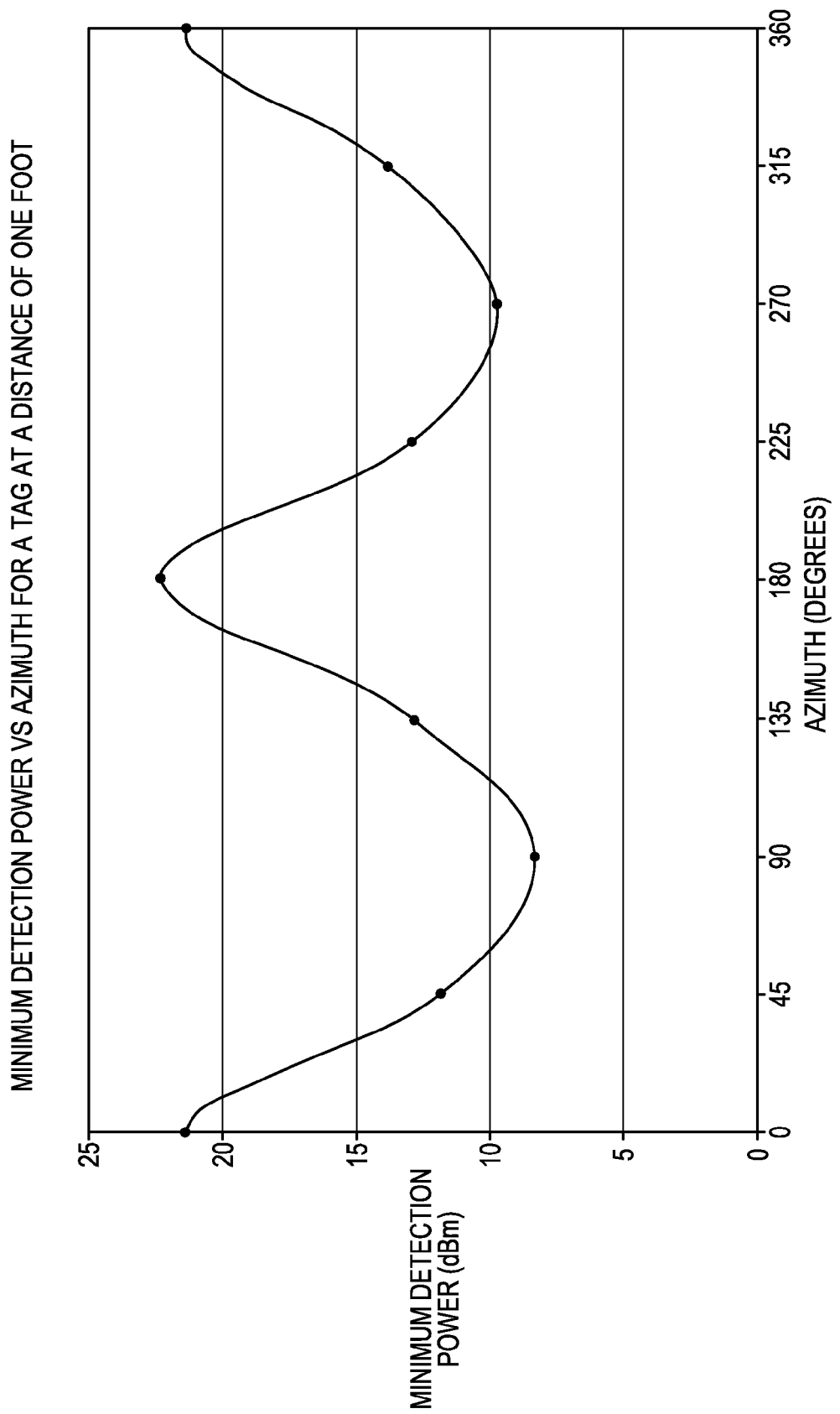
FIG. 6 is plot of minimum detection power versus azimuth angle.

By inspection, we can see that the maximum gain (or minimum attenuation) will occur when the reader is pointed directly at the tag ($\theta=90°$). This will correspond to the lowest minimum detection power across all azimuth angles for the given distance between the reader and the tag. By symmetry, a similar minimum in the minimum detection power will occur at θ=270°. The minimum gain (or maximum attenuation) will occur at θ=0° and θ=180°. These angles will therefore correspond to the largest minimum detection powers across all azimuth angles for the given distance between the reader and the tag. FIG. 6 shows how the minimum detection power varies with azimuth angle. From FIG. 6, it is clear that an azimuth direction to a tag can be found by seeking a minimum in the minimum detection power curve while sweeping the reader through a range of angles in the horizontal (x-y) plane, i.e., $$\frac{dP}{d\theta} = 0 \text{ and } \frac{d^2P}{d\theta^2} > 0.$$

Angular information then can be output by logic circuitry 302 to display 205.

Because there are two minima corresponding to the direction toward and away from the tag, one additional step will need to be performed: moving radially in the direction of the minimum to observe the effect on the minimum detection power. If the minimum detection power decreases, the direction is the true direction toward the tag; if the minimum detection power increases, the direction is 180 degrees opposite from the true direction. We now consider how to exploit this phenomenon to provide directional feedback for two cases: (1) when the orientation of the reader is known (i.e., measurable via a sensor, compass, encoder, etc.) and (2) when the orientation is unknown.

Case 1: Orientation Known

When the orientation is known, we can provide detailed directional feedback to the user. The reader must be rotated about the z-axis (i.e., rotated in the horizontal plane) to produce a sequence of power measurements per azimuth angle.

Direction of Rotation

The direction of rotation is given by the sign of the rotation rate $$\frac{d\theta}{dt}$$

: if $$\frac{d\theta}{dt} > 0,$$

rotation is counterclockwise (CCW) about z-axis; otherwise if $$\frac{d\theta}{dt} < 0,$$

rotation is clockwise (CW) about the z-axis. Assuming the azimuth angles can be measured, we can approximate $$\frac{d\theta}{dt} \text{ by } \frac{\Delta\theta}{\Delta t}$$

where Δθ is the difference between successive azimuth measurements $\Delta\theta=\theta_k-\theta_{k-1}$ and Δt is the sampling interval $\Delta t=t_k-t_{k-1}$. The sampling interval will always be positive so we only need to check the sign of Δθ to determine the direction of rotation.

TABLE 1

Direction of Rotation

| Δθ | Direction of Rotation |
|---|---|
| <0 | Clockwise (CW) |
| >0 | Counterclockwise (CCW) |

Direction of Turn

The direction of rotation can be related to the direction of turn as follows: if the reader is turning CCW, it is turning toward the left as seen by the user. If the reader is rotating CW, it is turning toward the right as seen by the user.

TABLE 2

Direction of Turn

| Direction of Rotation | Direction of Turn |
|---|---|
| Clockwise (CW) | RIGHT |
| Counterclockwise (CCW) | LEFT |

Direction to Minimum

For a given change in azimuth Δθ, there will be a corresponding change in power ΔP. The ratio $$\frac{\Delta P}{\Delta\theta}$$

is an approximation of $$\frac{dP}{d\theta}.$$

Figure 7:
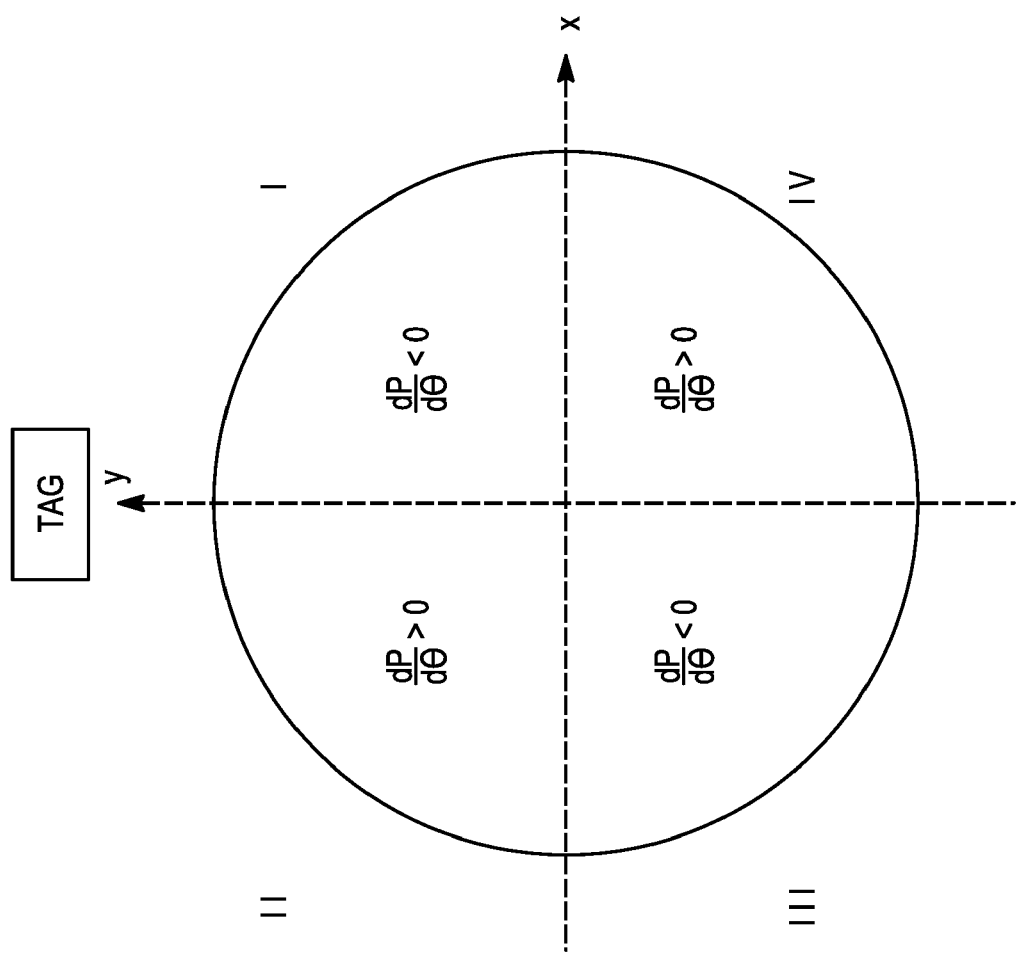
FIG. 7 is a chart showing the relationship between changes in power and changes in azimuth angle.

We can map the power curve to a unit circle in the x-y plane as shown in FIG. 7. The valleys in FIG. 6 correspond to the ±y axes and the peaks correspond to the ±x axes. The sign of the slope of the curve varies from quadrant to quadrant but is the same within each quadrant as shown in FIG. 7.

Table 3 shows how the Δθ and ΔP measurements can be used to determine the direction to the nearest minimum (remember that the direction to the tag may be 180 degrees opposite the direction to the minimum.)

TABLE 3

Direction to Minimum

| Δθ | ΔP | Quadrants | Motion | Direction to Minimum |
|---|---|---|---|---|
| >0 | >0 | II, IV | Away from Minimum | To the RIGHT |
| >0 | <0 | I, III | Toward Minimum | To the LEFT |
| <0 | >0 | I, III | Away from Minimum | To the LEFT |
| <0 | <0 | II, IV | Toward Minimum | To the RIGHT |

Table 4 summarizes all of the directional feedback results for case 1.

TABLE 4

Directional Feedback Summary for Case 1

| Δθ | ΔP | Direction of Rotation | Direction of Turn | Direction to Minimum |
|---|---|---|---|---|
| >0 | <0 | CCW | LEFT | LEFT |
| >0 | >0 | CCW | LEFT | RIGHT |
| <0 | <0 | CW | RIGHT | RIGHT |
| <0 | >0 | CW | RIGHT | LEFT |

Figure 8:
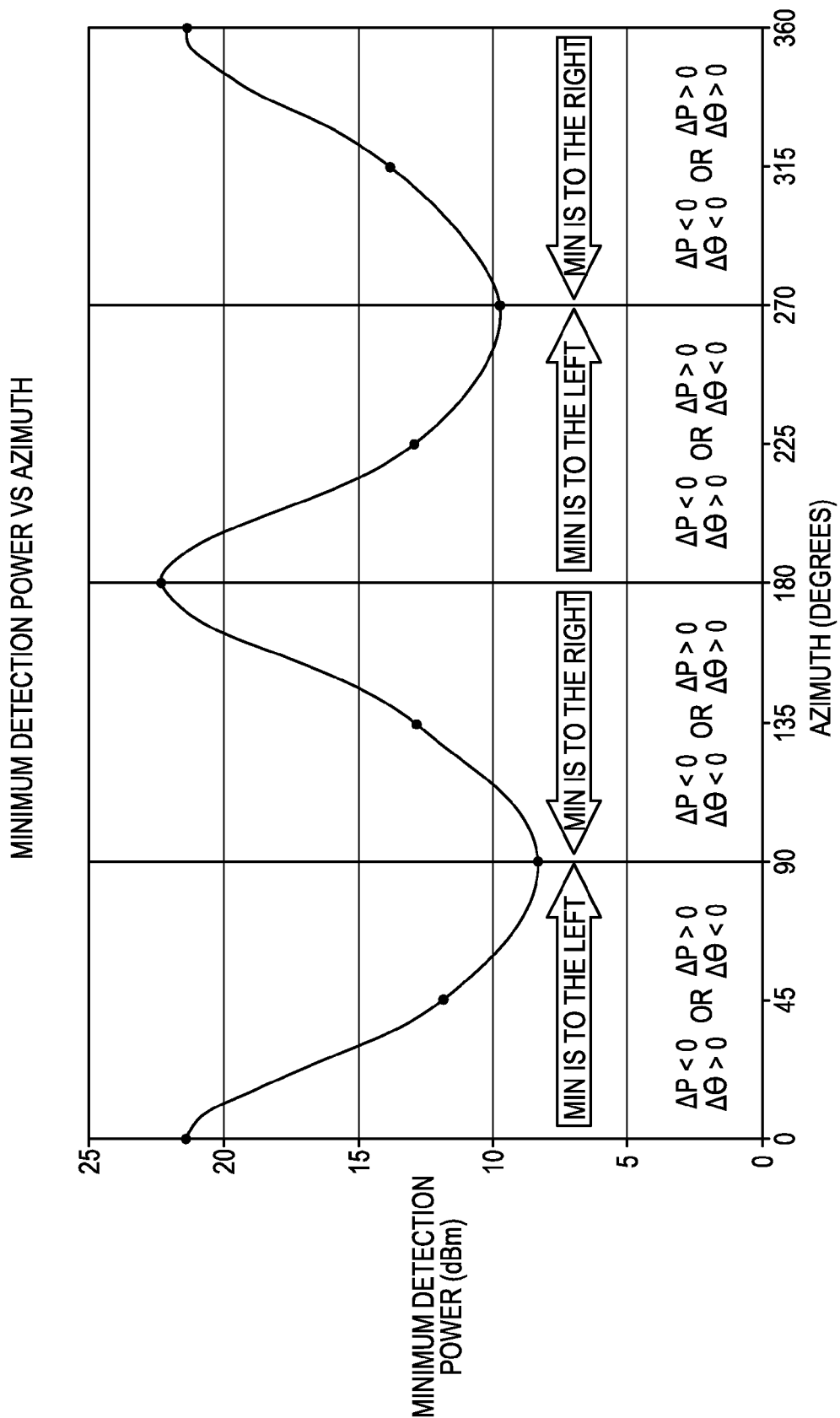
FIG. 8 is plot of minimum detection power versus azimuth angle that includes directional feedback.

FIG. 8 shows how these results could be applied to the power curve of FIG. 6.

The final step, once the direction to a minimum has been determined, will be to move radially in that direction to determine if the direction is the true direction to the tag or if it is 180 degrees opposite the true direction.

Case 2: Orientation Unknown

If the orientation of the reader is unknown and cannot be measured, as is the case with current handheld devices like the MC9090-G, the detection rate will be a function of time. If we try to determine directional feedback based on the slope of such a power curve, we will need to take into account the implicit dependence of the power curve on the rotation rate of the reader:

$$\frac{dP}{dt} = \frac{dP}{d\theta}\frac{d\theta}{dt}.$$

The unknown rotation rate $$\frac{d\theta}{dt}$$

will complicate matters because of the potential for false minima leading to incorrect directional information. When the power curve was a function of angle, finding a minimum was straightforward. Now, however, a minimum of $$\frac{dP}{dt}$$

may also occur when $$\frac{d\theta}{dt} = 0.$$

This can happen when the reader is stationary and when the reader's direction of rotation changes.

Stationary Reader

This case can be detected and avoided by checking the second derivative of the power curve. If the reader has stopped rotating, both the first and second derivatives will be zero; if the reader has rotated through a minimum in the minimum detection cower curve, the second derivative will be positive:

$$\frac{d^2P}{dt^2} > 0.$$

Change in Direction of Rotation

Figure 9:
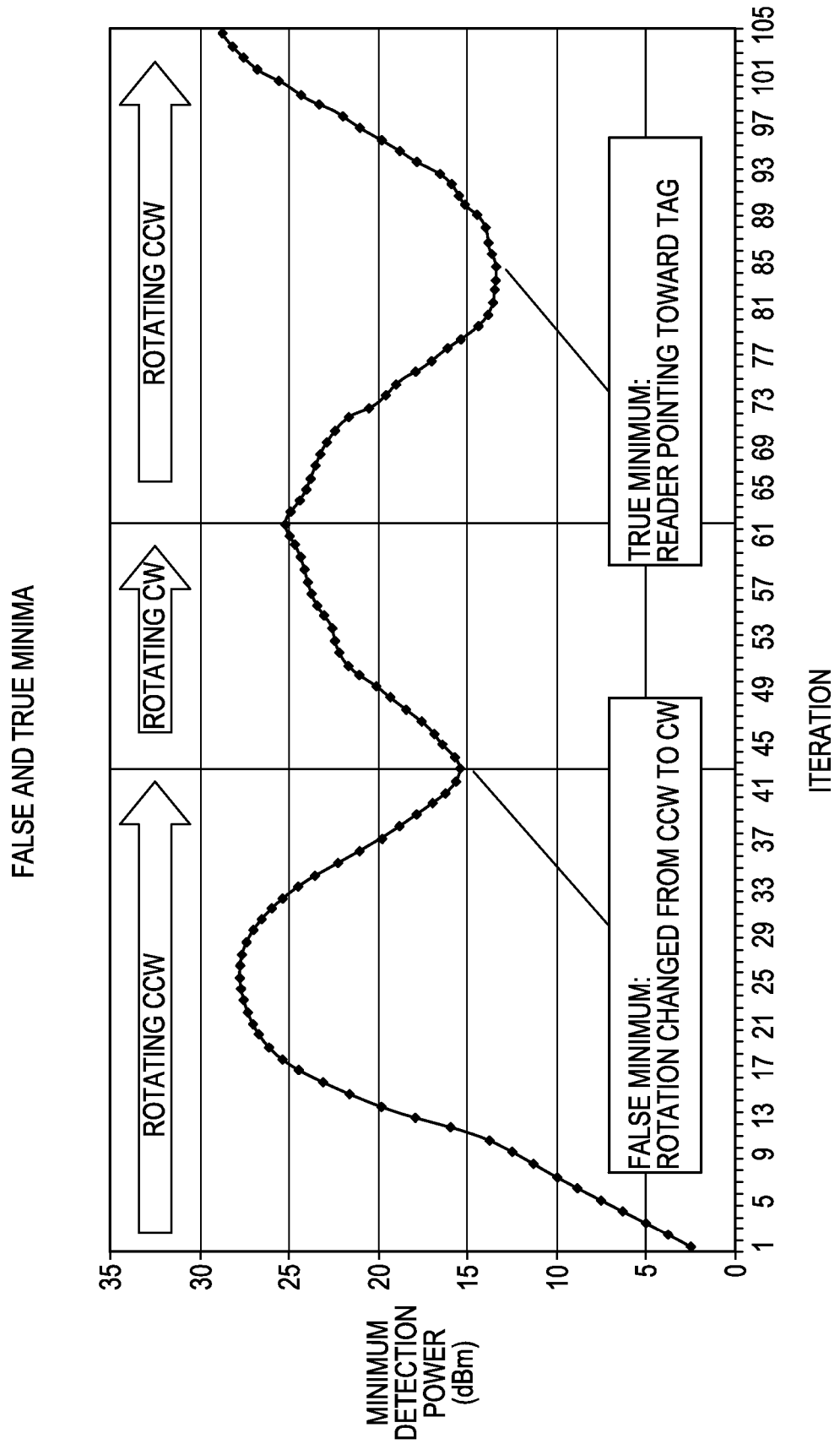
FIG. 9 is a plot of minimum detection power versus time showing true and false minima.

The second false minimum occurs when the direction of rotation changes. FIG. 9 shows a minimum detection power curve as a function of time. There are two minima, but only one is a true minimum in the power curve; the other minimum is due to a change in the direction of rotation of the reader. Unfortunately, because the second derivative in these cases will be nonzero, the trick we used above will not help to detect this case. Unless there is some additional information (e.g., from a sensor) that can be utilized to detect this case, the user will have to be aware of the impact of changing the direction of rotation on the direction finding algorithm.

Directional Feedback

When the orientation is unknown, we can only determine whether we are rotating toward or away from a minimum. Regardless of the direction of rotation, the minimum detection power will decrease when we are moving toward a minimum and increase when we are moving away from a minimum. We cannot therefore determine which quadrant we are in, what direction we are moving, or where the minimum may be in relation to the reader's current orientation.

Figure 10:
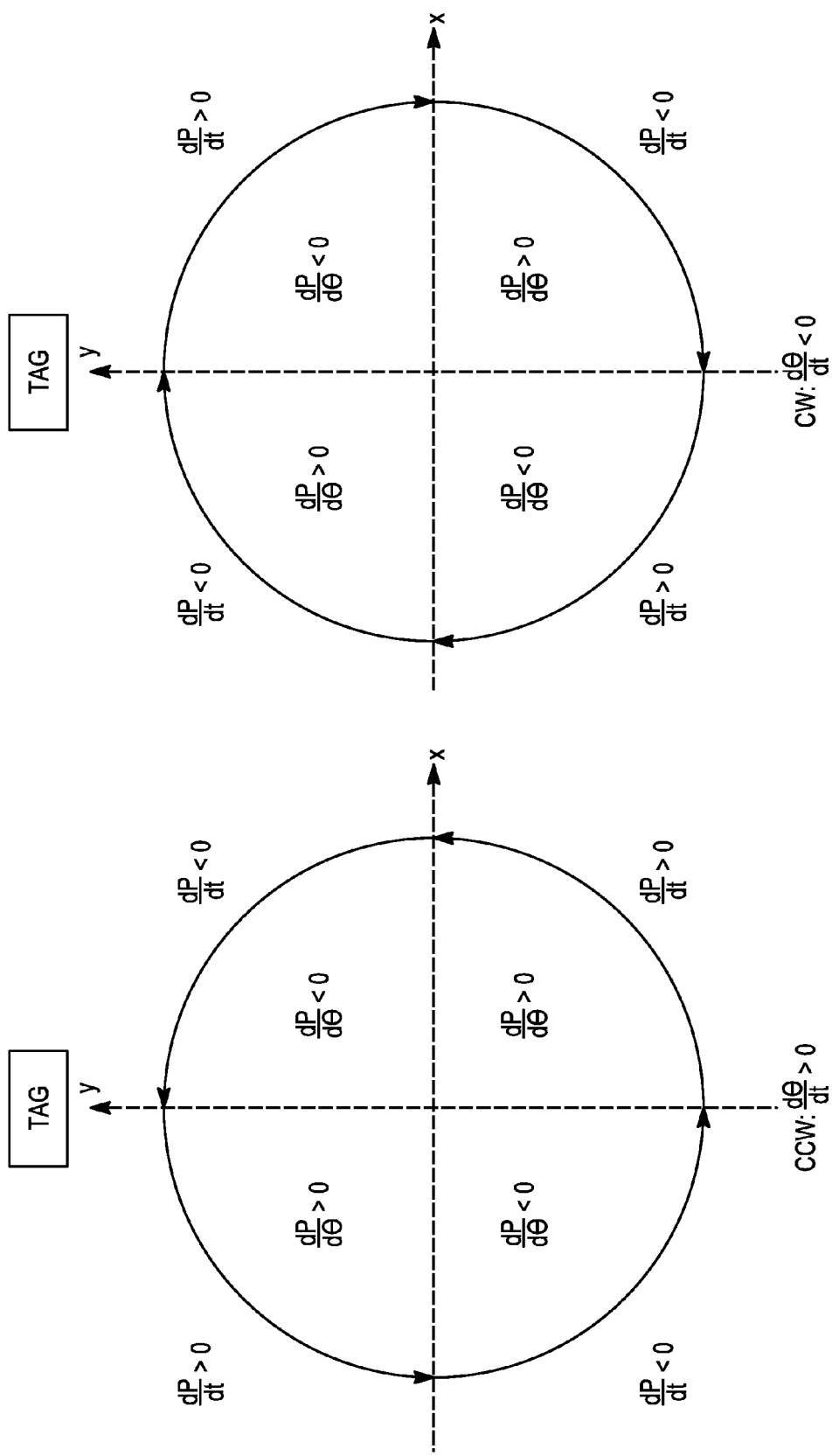
FIG. 10 is a pair of charts showing the relationships between changes in power and changes in azimuth angle for different rotation rates.

For example, if the minimum detection power is decreasing with time, we cannot tell if the reader is rotating counter-clockwise and we are in quadrants I or III or if the reader is rotating clockwise and we are quadrants II or IV. FIG. 10 illustrates this problem.

Figure 11:
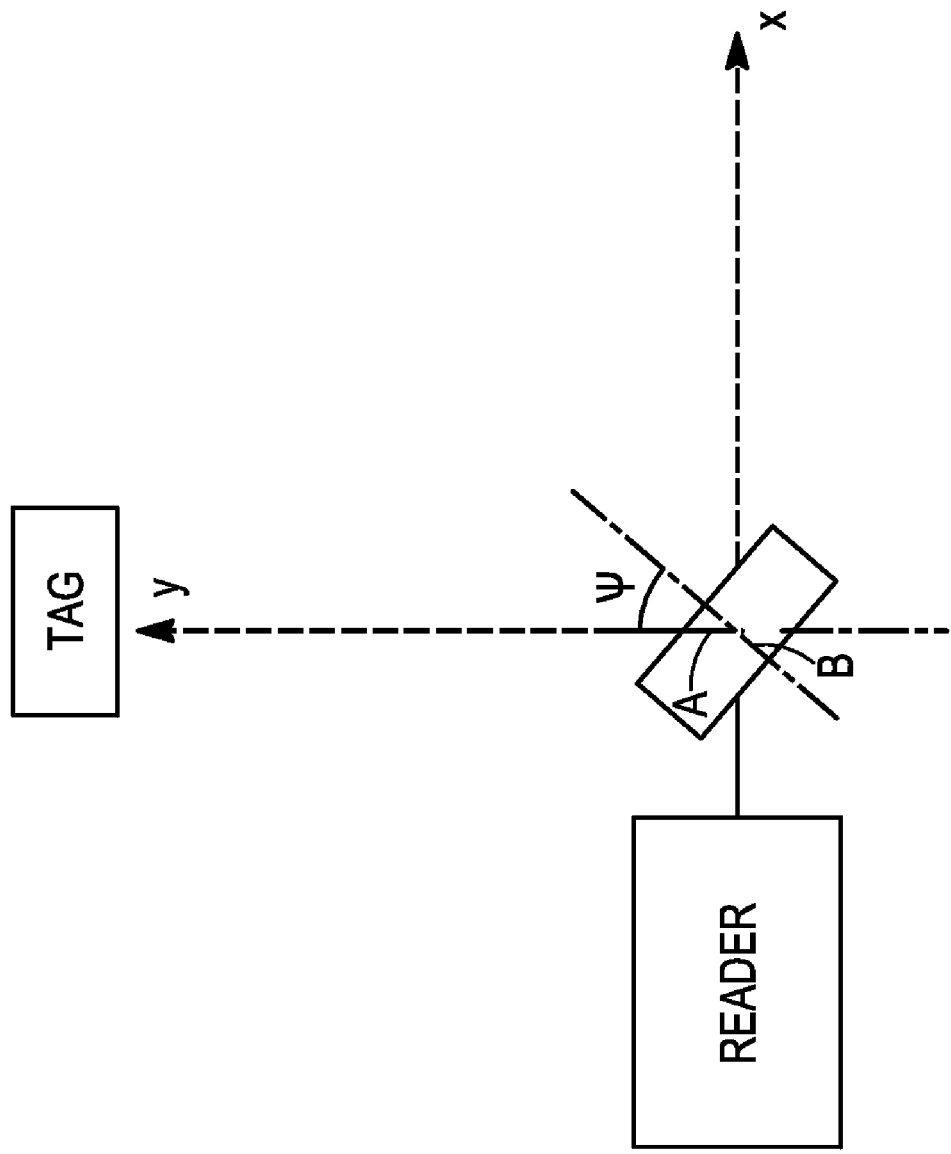
FIG. 11 is a diagram of a reader with a crossed dipole antenna and a tag.

We can compensate for the shortcomings of the single antenna case by providing a second antenna and comparing the minimum detection power curves. If we provide a second dipole antenna B that is physically offset by some angle $\psi$ from antenna A, such as in a crossed-dipole configuration shown in FIG. 11, the minimum detection power curve of antenna B will be will be $\psi$ degrees out of phase with A's minimum detection power curve. This phase difference can be exploited to provide directional feedback through quadrature encoding. It should be noted, however, that $\psi$ must not be an integer multiple of 90 degrees because the A and B power curves would either be identical (for $\psi$ an even multiple of 90 degrees) or negatives of each other (for $\psi$ an odd multiple of 90 degrees). This would render the proposed method useless since it would be impossible to determine whether A leads B or lags B in these cases (it can be seen in FIG. 6 that the minimum detection power curve has 180 degree periodicity, which is why an offset that is a multiple of 90 degrees will result in either identical or opposite curves.) We recommend using an angle of $\psi=45°$ because this will produce minimum detection power curves that are a quarter waveform out of phase and therefore will yield symmetric transitions between states (see below). The effect of using an angle other than 45 degrees will be to shift the curves in relation to each other, altering the amount of time spent in some states.

For example, assume that the reader is rotating counter-clockwise about the z-axis (i.e. turning left from the point of view of the user.) The resulting minimum detection power curves would be like those in FIG. 12 where the A curve leads the B curve (for the sake of simplicity, we assume that each unit of time corresponds to an angular resolution of 1 degree). Similarly, if we assume that the reader is rotating clockwise about the z-axis (i.e. turning right from the point of view of the user) then the resulting power curves would be like those in FIG. 13 with A lagging B.

Knowing whether A is leading or lagging B can therefore be used to determine the direction of rotation, i.e. counterclockwise (CCW) about the z-axis or clockwise (CW) about the z-axis, and the direction of turn, i.e. to the left or the right. The question is how to determine the relationship between the A and B power curves. In the preferred embodiment, we use quadrature encoding which will be explained below.

Direction of Turn

Using the recommended angle of ψ=45°, the A and B power curves are 45° out of phase. As a result, only one curve's concavity changes per quarter cycle (note that because one cycle for each curve is 180°, 45° constitute one quarter cycle.) The concavity of each curve is given by the sign of its second derivative $$\frac{d^2 P}{dt^2}.$$

If we assign a one-bit value for each sign, such as in Table 5, we can encode each quarter cycle of the combined power curves to produce unique Gray code sequences for both the A leads B and A lags B cases.

TABLE 5

Concavity Bit Values

| $\frac{d^2 P}{dt^2}$ | Bit Value |
|---|---|
| >0 | 0 |
| <0 | 1 |

Figure 12:
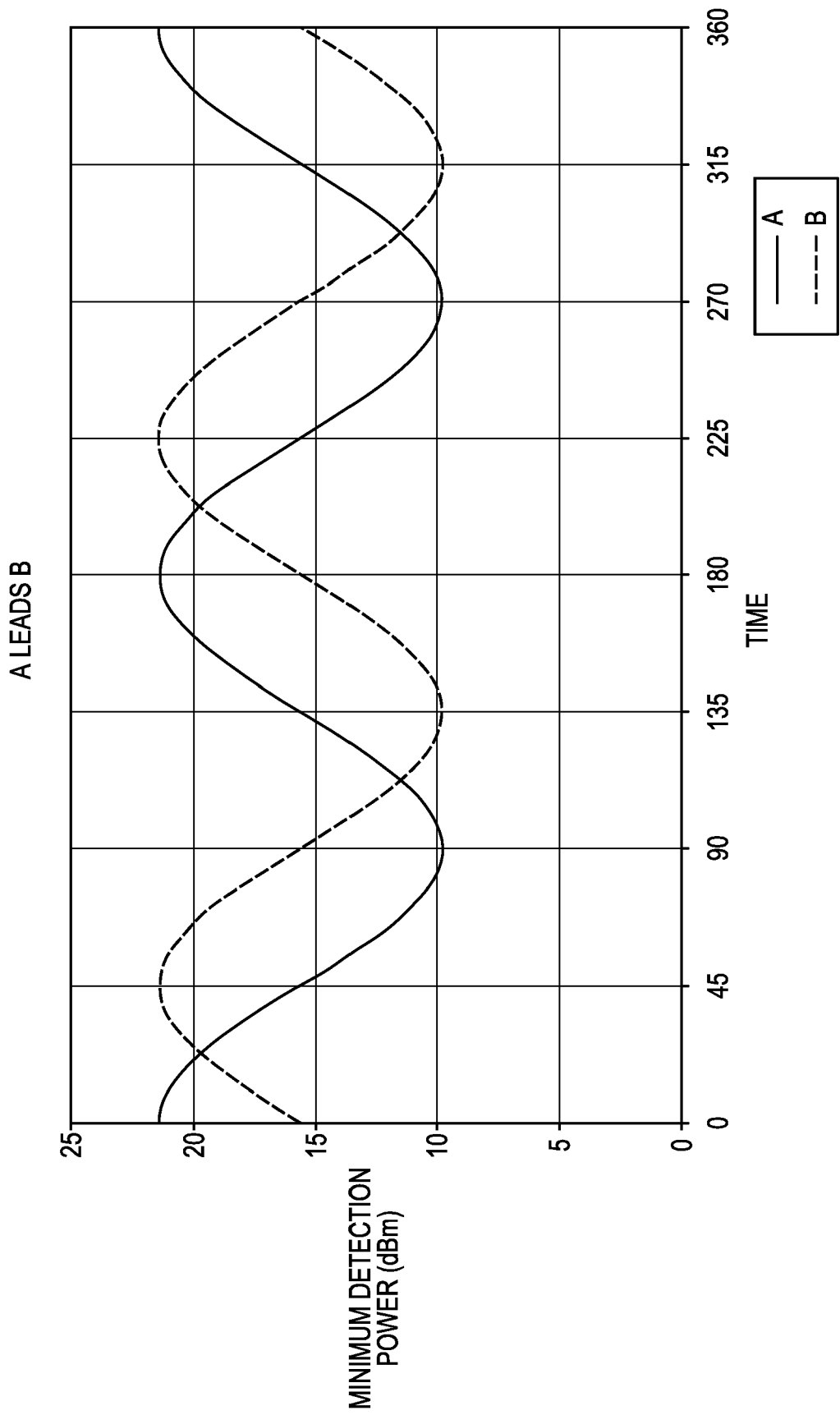
FIG. 12 is a plot of minimum detection power curves versus time for a crossed dipole antenna showing a phase lead characteristic.
Figure 13:
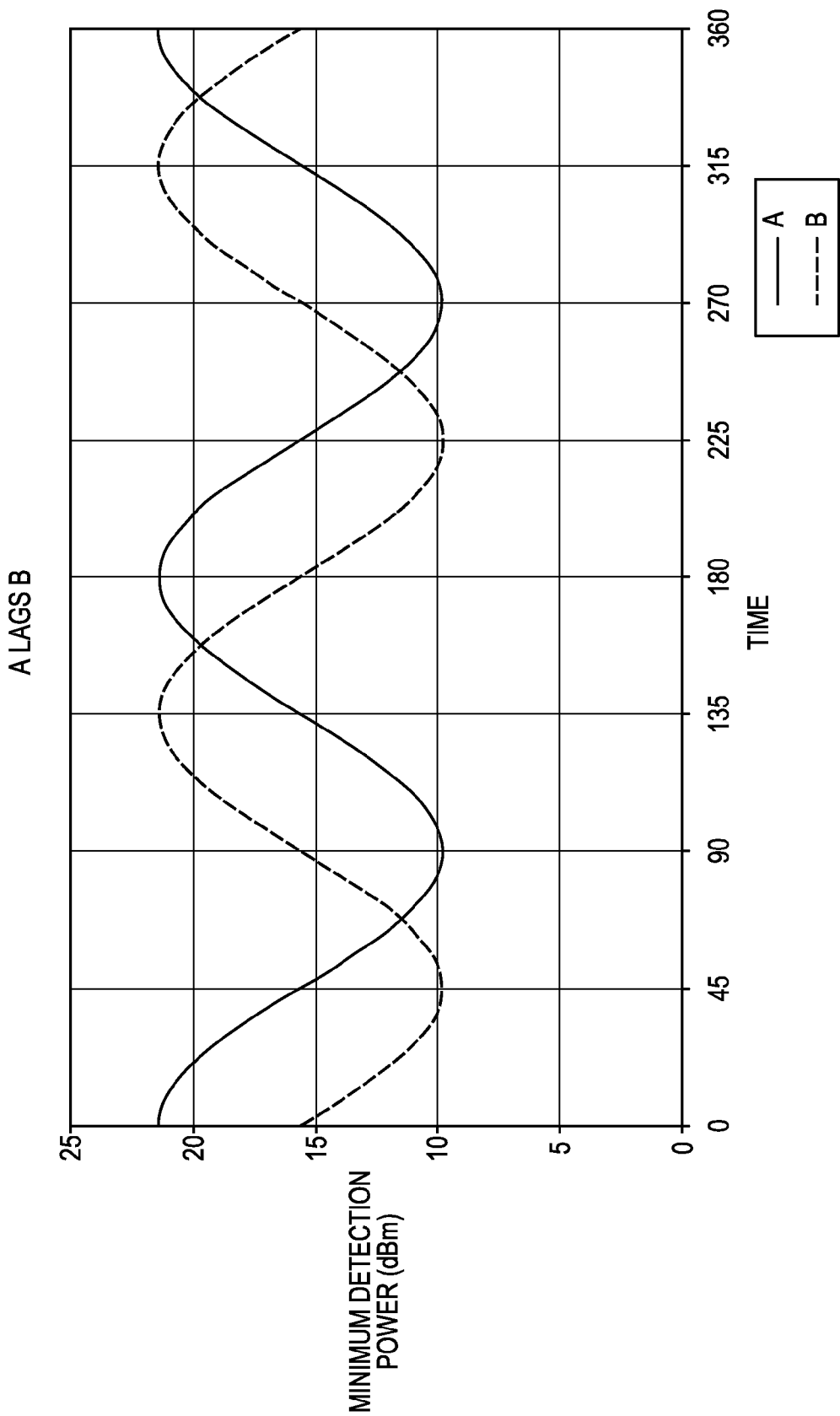
FIG. 13 is a plot of minimum detection power curves versus time for a crossed dipole antenna showing a phase lag characteristic.

Table 6 shows the Gray encoding for the minimum detection power curves in FIG. 12 when A leads B. Table 7 shows the Gray encoding for the minimum detection power curves in FIG. 13 when A lags B.

TABLE 6

Gray Sequence for A Leads B

| Quarter Cycle | $\frac{d^2 P_A}{dt^2}$ | $\frac{d^2 P_B}{dt^2}$ | A | B |
|---|---|---|---|---|
| 0-45 | <0 | <0 | 1 | 1 |
| 45-90 | >0 | <0 | 0 | 1 |
| 90-135 | >0 | >0 | 0 | 0 |
| 135-180 | <0 | >0 | 1 | 0 |

TABLE 7

Gray Sequence for A Lags B

| Quarter Cycle | $\frac{d^2 P_A}{dt^2}$ | $\frac{d^2 P_B}{dt^2}$ | A | B |
|---|---|---|---|---|
| 0-45 | <0 | >0 | 1 | 0 |
| 45-90 | >0 | >0 | 0 | 0 |
| 90-135 | >0 | <0 | 0 | 1 |
| 135-180 | <0 | <0 | 1 | 1 |

Figure 14:
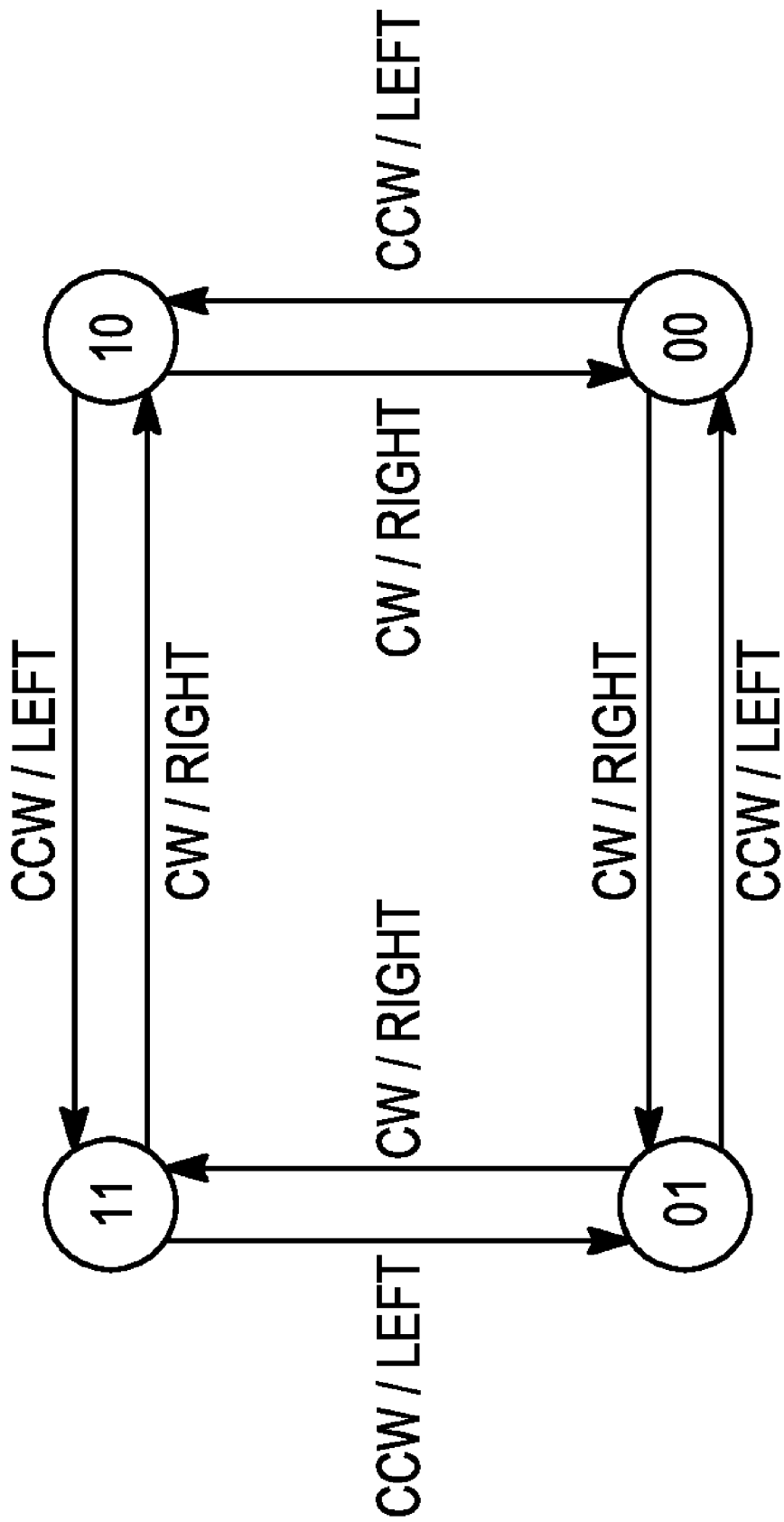
FIG. 14 is a state change diagram for the quadrature encoding method of determining direction of rotation.

The sequences are different for the two cases. They can be viewed graphically in the state transition diagram of FIG. 14.

By maintaining a two-bit state and observing transitions it will be possible to determine the direction of rotation and direction of turn.

The quadrature encoding method can be made insensitive to variations/glitches in measurements of one antenna because such glitches will cause invalid state changes, e.g., from 00 to 11. Assuming these glitches are transient in nature, these invalid transitions can be ignored. Furthermore, because the method is based on determining which power curve leads or lags the other, as long the two antennas A and B are not 90° apart, the method will work. The effect of using an angle other than the recommended 45° will be to shift the curves either closer together or farther apart, altering the amount of time spent in some states.

Directional Feedback

If this method is being used on a mobile RFID reader to provide directional feedback to the user, the user will need to sweep the reader through an angle to generate the A and B antennas' minimum detection power curves. If the resulting Gray code sequence indicates that A leads B, we know we are rotating counterclockwise, i.e., turning to the left. If A lags B, we know we are turning to the right. Using A as the reference, when A is decreasing we know we are turning toward the tag and when A is increasing we are turning away from the tag. We can now couple this information with the direction as shown in Table 8.

TABLE 8

Directional Feedback

| $\frac{dP_A}{dt}$ | Direction of Turn (from Gray code sequence) | Directional Feedback |
|---|---|---|
| <0 | LEFT | Tag is to the LEFT |
| <0 | RIGHT | Tag is to the RIGHT |
| >0 | LEFT | Tag is to the RIGHT |
| >0 | RIGHT | Tag is to the LEFT |

Eliminating False Positives

We previously showed that when minimum detection power is a function of time, a "false minimum" may occur due to a change in the direction of rotation of the reader (see FIG. 9) that could not be detected with a single antenna. The two-antenna method we just described, however, can be used to identify and eliminate this false minimum.

Figure 15:
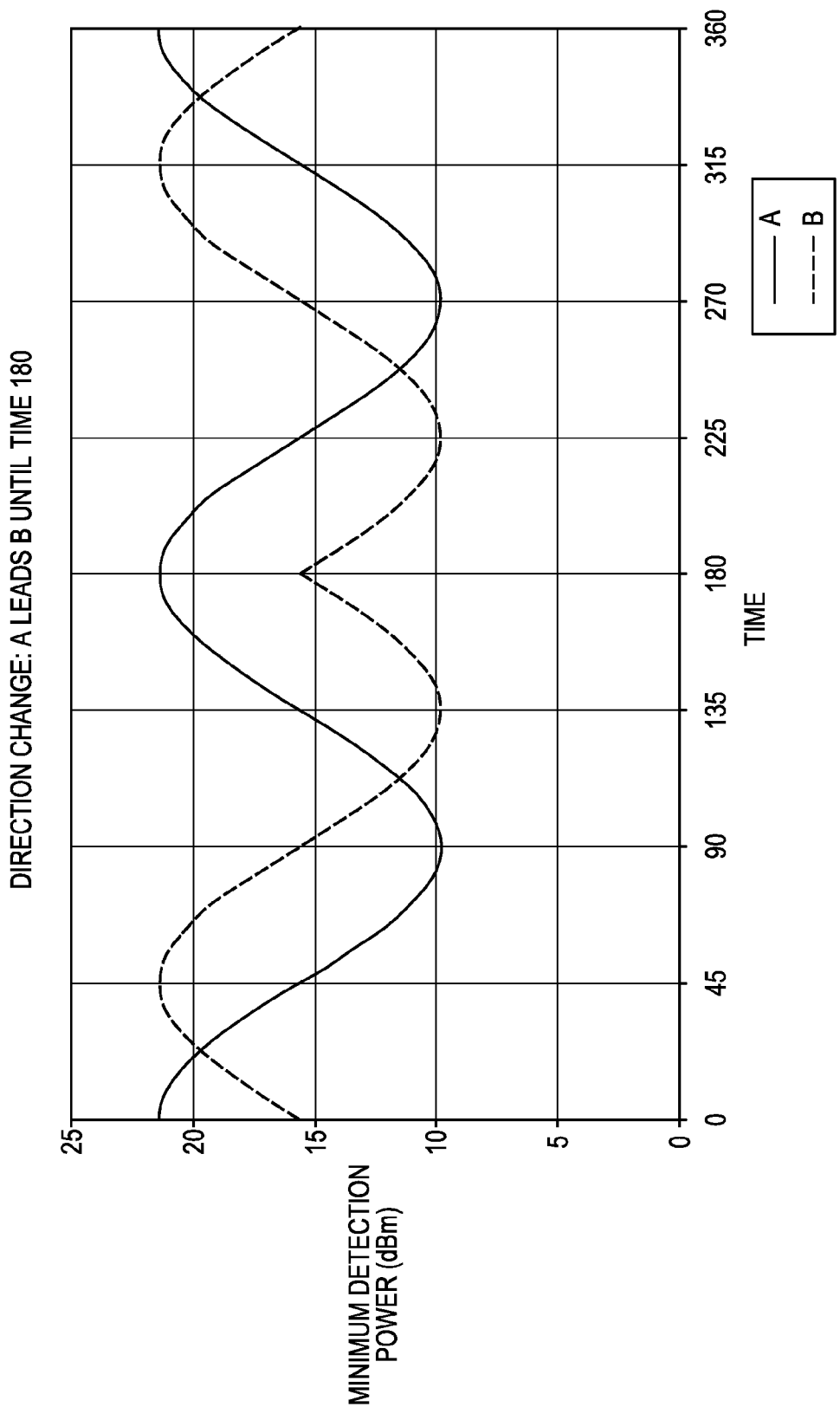
FIG. 15 is a plot of minimum detection power curves versus time for a crossed dipole antenna showing the effect of a change in the direction of rotation.

One solution method would be to note a change in the Gray code sequences, but this method has an inherent quarter cycle lag. To see this, consider FIG. 15 which shows a direction change at time 180 from CCW (turning left) to CW (turning right). Prior to time 180, curve A leads curve B but afterward B leads A. The corresponding state transitions are given in Table 9.

TABLE 9

Detecting Change in Direction

| Time Range (Iterations) | A | B |
|---|---|---|
| 0-45 | 1 | 1 |
| 45-90 | 0 | 1 |
| 90-135 | 0 | 0 |
| 135-180 | 1 | 0 |
| 180-225 | 1 | 0 |
| 225-270 | 0 | 0 |
| 270-315 | 0 | 1 |
| 315-360 | 1 | 1 |

From time 0 to 180, A leads B because the reader is turning left. The transition at time 180 is to the same state because of the change in the direction of rotation. This will occur even if the transition is in the middle of a quarter cycle. It will take until next quarter cycle begins at time 225 to see a change in the sequence: we transition from state 10 to state 00 which means A now lags B because the reader is turning right. This quarter cycle delay is inherent in the method; the actual delay time will be dependent upon the rotation rate of the reader.

A more efficient approach would be to note any time duration during which both the A and B power curves' slopes changed sign simultaneously because this will only happen during direction changes. This method will not have any time lag and will be able to provide nearly instantaneous feedback to the user that the direction changed.

Direction of Traversal

The method described in this disclosure could be also used to detect the direction of motion through a doorway, along an aisle in a store, or along a conveyor. For this scenario, unlike the previous ones, the reader would be assumed to be stationary while the tag is moving. If the tag passes the reader moving from left to right, the A power curve will lead the B power curve. If the tag passes the reader from right to left, the A power curve will lag the B power curve.

While the invention has been particularly shown and described with reference to a particular embodiment, it will be understood by those skilled in the art that various changes in form and details may be made therein without departing from the spirit and scope of the invention. For example, the range finding method disclosed above may be used until the minimum detection power needed to activate a tag is lower than the minimum transmission power of the reader. Any further decrease in distance will cause the reader to remain at its minimum transmission power and thus prevent the system from narrowing the range to the tag any farther. It is at this point that the technique may switch from the method described above, to an RSSI method.

Figure 16:
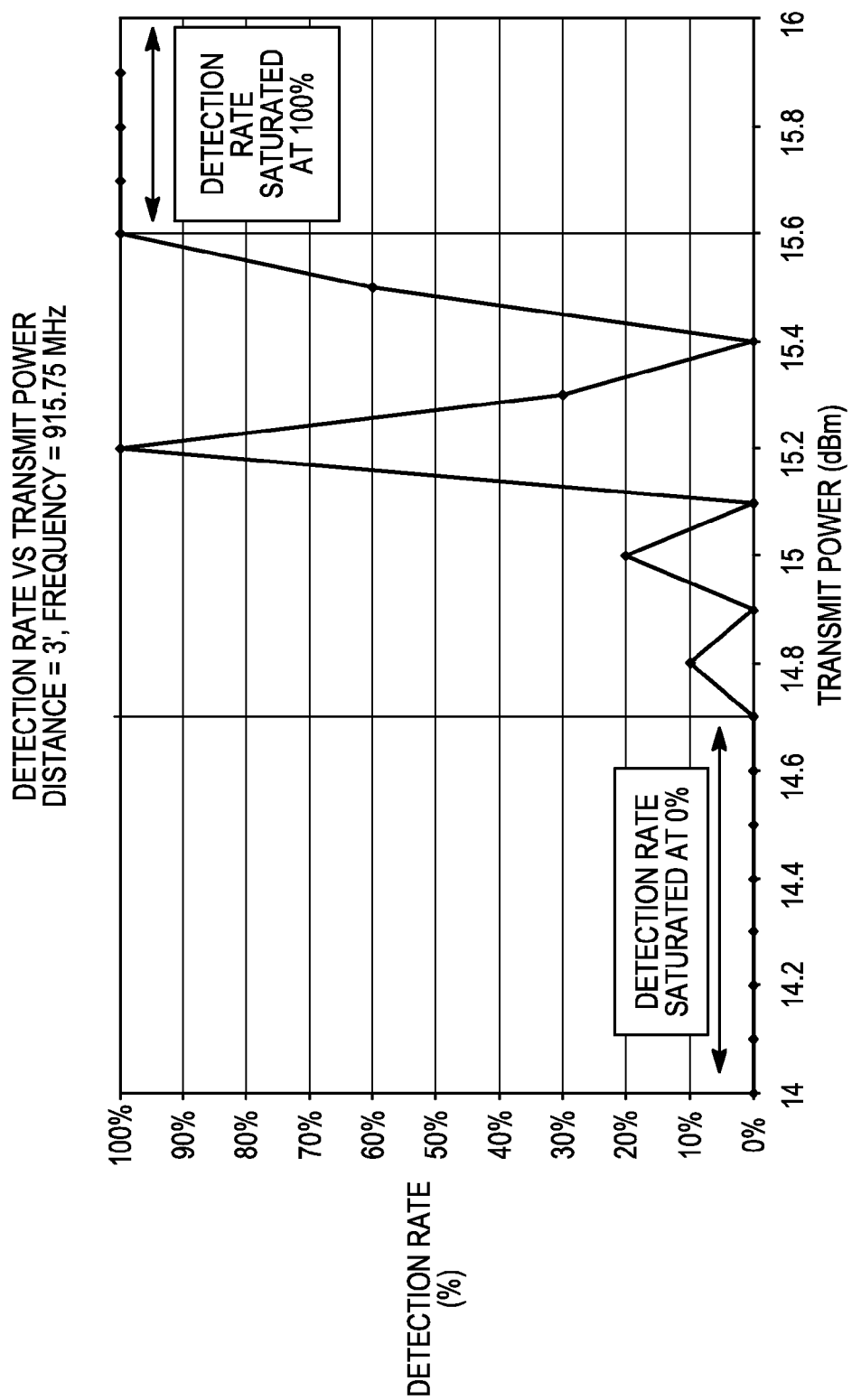
FIG. 16 is a plot of detection rate versus transmission power for a fixed frequency and a fixed distance.

Another modification to the above technique may be accomplished by using an adaptive controller with multiple gains instead of a proportional controller to adjust the transmission power. The measured detection rate will be between 0% and 100%, inclusive. In general, there will be a one-to-one correspondence between transmit power and measured detection rate when the measured detection rate is greater than 0% and less than 100%. There will be many transmission powers, however, that will result in exactly 0% detections and exactly 100% detections. The measured detection rate saturates at these values and as a result information is lost on how far from the desired detection rate a reader is (in other words, it is not known how much to change the transmission power to near the desired detection rate.) FIG. 16 shows a typical detection rate versus transmission power plot for a fixed distance and fixed frequency.

The adaptive controller would utilize one of a plurality of (e.g., two) different gain values: a small gain for incrementally adjusting the transmission power when the measured detection rate is greater than 0% and less than 100%; and a large gain for course adjustment of the transmission power when the detection rate is saturated at 0% and 100%. The higher saturation gain helps to improve the response time by making larger changes in the transmission power when the reader's current transmission power is too far from the minimum detection power while the smaller gain enables higher accuracy adjustments when the reader's transmission power is close to the minimum detection power. Such changes come within the scope of the following claims.

The invention claimed is:

1. A method for determining location information within a communication system, the method comprising the steps of:
   transmitting by a transmitter, a plurality of queries to a node within the communication system;
   listening for responses from the node;
   determining a detection rate, wherein the detection rate is based on a number of responses heard from the node and a number of queries transmitted to the node;
   determining a transmit power needed to maintain a desired detection rate;
   adjusting the transmit power to maintain the desired detection rate; and
   displaying information about the transmit power.

2. The method of claim 1 wherein the detection rate comprises the number of responses heard from the node divided by the number of queries transmitted to the node.

3. The method of claim 1 wherein the desired detection rate comprises a 50% detection rate.

4. The method of claim 1 wherein the node comprises an asset tag.

5. The method of claim 1 wherein the transmitter comprises an RFID reader.

6. The method of claim 1 wherein the step of displaying information about the transmit power comprises the step of displaying a bar with a height of the bar indicating the transmit power.

7. The method of claim 1 further comprising the step of:
   outputting an audible indication of the transmit power.

8. The method of claim 1 wherein the node within the communication system transmits a response as a result of hearing one of the plurality of queries transmitted by the transmitter.

9. The method of claim 1 further comprising the step of:
   moving the transmitter wherein the movements will affect the displayed information.

10. The method of claim 9 wherein the step of displaying information about the transmit power comprises the step of displaying a bar with a height of the bar indicating the transmit power, and the bar will grow or shrink in order to provide feedback to a user that the user is moving toward or away from the node.

11. An apparatus for determining location information within a communication system, the apparatus comprising:
   a transmitter transmitting a plurality of queries to a node within the communication system;
   a receiver listening for responses from the node;
   logic circuitry determining a detection rate, wherein the detection rate is based on a number of responses heard from the node and a number of queries transmitted to the node, the logic circuitry additionally determining a transmit power needed to maintain a desired detection rate and adjusting the transmit power to maintain the desired detection rate; and
   a display displaying information about the transmit power.

12. The apparatus of claim 11 wherein the detection rate comprises the number of responses heard from the node divided by the number of queries transmitted to the node.

13. The apparatus of claim 11 wherein the desired detection rate comprises a 50% detection rate.

14. The apparatus of claim 11 wherein the node comprises an asset tag.

15. The apparatus of claim 11 wherein the transmitter comprises an RFID reader.

* * * * *